Aug. 9, 1938.    C. R. PATON    2,126,498
MOTOR VEHICLE
Filed June 8, 1934
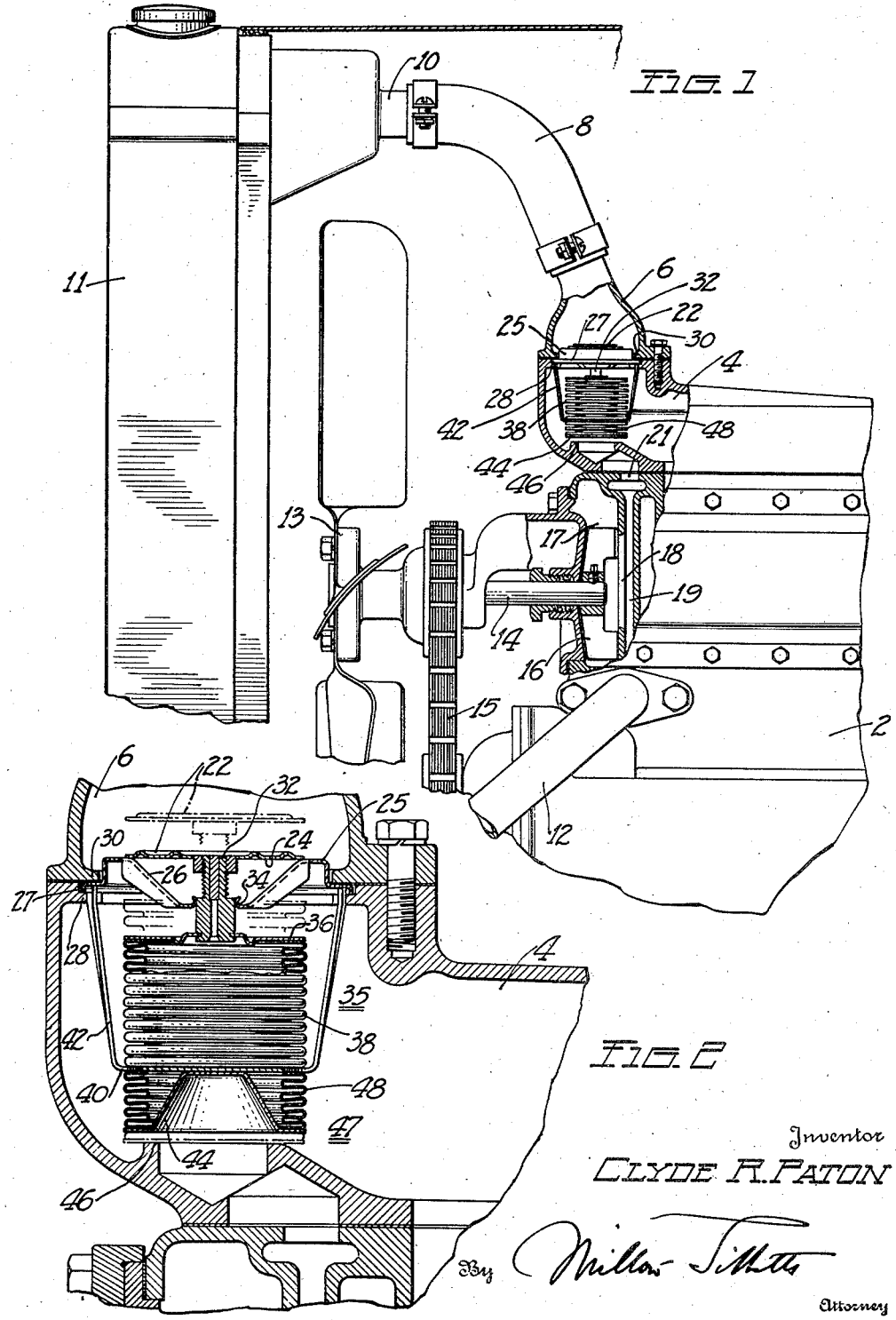

Patented Aug. 9, 1938

2,126,498

UNITED STATES PATENT OFFICE 2,126,498

MOTOR VEHICLE

Clyde R. Paton, Birmingham, Mich., assignor to Packard Motor Car Company, Detroit, Mich., a corporation of Michigan Application June 8, 1934, Serial No. 729,567

5 Claims. (Cl. 236—34)

This invention relates to internal combustion engines and more particularly to mechanism for controlling the flow of water or other cooling fluid through the cooling system of an engine of this type.

In the cooling system of certain internal combustion engines, a by-pass is provided for short circuiting the radiator when the engine is cold. In such engines two valves controlled by a thermostat have been provided respectively for controlling the flow of the cooling fluid from the engine through the radiator, and for controlling the flow of said fluid through the by-pass. When the engine is cold, the first of these valves is closed to cut off the flow of the fluid to the radiator and the second of said valves is open to provide for the free flow of the fluid through the by-pass. Under these conditions the engine heats up rapidly and substantially as the cooling fluid reaches a predetermined temperature, the first valve, under the action of the thermostat, is opened to allow part of the cooling fluid to pass through the radiator.

It is desirable that the valve controlling the by-pass as well as the valve controlling the circulation through the radiator should remain in open position until the cooling fluid reaches a predetermined high temperature at which the full cooling capacity of the radiator is required. The valve controlling devices of prior constructions have not been constructed to secure this result. In such constructions the valve controlling the by-pass is often closed when the temperature of the cooling fluid is considerably below the latter predetermined temperature. With the by-pass closed all of the cooling fluid is passed through the radiator and the full cooling effect of the radiator is obtained. In cold weather the fluid is returned from the radiator to the engine jacket at a relatively low temperature. This results in the passing of a flood of relatively cold fluid from the radiator into the engine jacket which chills the engine and may result in the cracking of the cylinder walls. When the cooling fluid of reduced temperature strikes the thermostat the second valve will be opened and part of the cooling fluid from the engine jacket will then flow through the radiator and part of said fluid will be returned to the engine jacket through the by-pass. This will result in an increase in the temperature of the cooling fluid within the engine jacket and often will cause the thermostat again to close the second valve. This intermittent closing and opening of the valve controlling the by-pass, which is known as "hunting", results frequently in variations of twenty to thirty degrees in the temperature within the engine block, and the engine, of course, will not run smoothly and efficiently under these temperature variations.

One object of the present invention is to improve the construction and mode of operation of cooling systems of the above character for internal combustion engines with a view of eliminating the "hunting" action of the thermostatically controlled mechanism.

Another object of the invention is to provide a cooling system of the character referred to for internal combustion engines in which the by-pass will be maintained in open condition until the cooling fluid reaches a predetermined high temperature at which the full cooling capacity of the radiator is required.

Another object of the invention is to provide, for such engines, mechanism for controlling the circulation of the cooling fluid through the radiator and through the by-pass having a novel construction and arrangement of thermo-controlled devices.

With the above and other objects in view, the invention consists in a construction embodying the novel and improved features hereinafter described and particularly pointed out in the claims, the advantages of which will be readily understood by those skilled in the art.

The invention will be clearly understood from the accompanying drawing illustrating the invention in its preferred form and the following detailed description of the construction therein shown.

In the drawing, Fig. 1 is a view partly in side elevation and partly in vertical section taken longitudinally of an engine and illustrating an engine embodying the invention and;

Fig. 2 is a detail view in vertical section on a larger scale and illustrating particularly the mechanism for controlling the flow of cooling fluid through the cooling system.

In the construction shown in the drawing, the invention is embodied in an internal combustion engine indicated at 2 having a water jacket comprising a chamber 4 extending over the head and connected by pipes 6, 8 and 10 with the upper chamber 10a of the radiator 11. The lower chamber of the radiator is connected by a pipe 12 with that part of the water jacket at the base of the engine. The engine also comprises a fan 13 mounted on a shaft 14 driven by a belt 15 and a water pump 16 secured to the inner end of the shaft.

The pump 16 rotates within a pump casing 17 having a central opening 18 connecting the casing with a passage 19, the lower end of which is connected with the pipe 12. The pump casing is provided with peripheral openings (not shown) leading to the space within the lower part of the engine jacket. A relatively short by-pass 21 within the engine jacket leads from the chamber 4 to the upper end of the passage 19. When the connection between the chamber 4 and the radiator is open, cooling fluid passes from the chamber 4 through the pipes 6, 8 and 10 to the radiator and returns to the engine jacket through the pipe 12. The fluid thence is drawn by the pump through the opening 18 in the pump casing, is discharged by the pump through the peripheral openings in the casing into the space within the lower part of the engine jacket and after circulating about the cylinder walls returns to the chamber 4. When the by-pass 21 is open, fluid from the chamber 4 passes from said chamber through the by-pass 21 into the upper end of the passage 19 and thence is drawn by the pump through opennig 18 into the pump casing from which it is circulated through the engine jacket.

In order to control the flow of cooling fluid from the water jacket to the radiator, a valve 22 is provided. This valve consists of a disc arranged to engage a valve seat 24 formed on a supporting member 25. The member 25 is mounted in the passage leading from the chamber 4 to the radiator and is provided with a series of openings 26 for the passage of the cooling fluid. Said member is provided with a marginal flange 27 which is clamped between the flanges 28 and 30 formed respectively on the chamber 4 and on the pipe 6 to secure the said member in place. The valve 22 is secured to the upper end of a longitudinally movable stud 32 passing through a guide 34 formed on the member 25. To the lower end of the stud 32 is attached a thermostat indicated as a whole at 35 and comprising a plate or disc 36 secured to the stud and an expansible and contractible chamber or bellows 38 attached at its upper end to the marginal portion of the disc which forms one end wall of the thermostat. The lower end of the bellows 38 rests upon and is secured to a plate 40 forming the other end wall of the thermostat. The plate 40 forms part of a yoke 42 embracing the bellows 38, the arms of the yoke extending upwardly from said plate and the upper ends thereof are secured to the member 25.

The flow of the cooling fluid through the by-pass is controlled by means of a valve 44 arranged to engage a valve seat 46 at the upper end of said by-pass. This valve consists of a disc forming the lower end wall of a thermostat indicated as a whole at 47 and comprising an expansible and contractible chamber or bellows 48, the lower end of which is secured to the marginal portion of said disc. The upper end of the bellows 48 is secured to and supported by the plate 40, said plate constituting the other end wall of the thermostat. The thermostat 35 is constructed and arranged to maintain the valve 22 in closed position when the motor is cold and to open said valve when the cooling fluid in the chamber 4 reaches substantially a predetermined temperature. The thermostat 47 is constructed and arranged to maintain the valve 44 in open position when the engine is cold and at all times after the engine has been warmed up while the cooling fluid is below a predetermined temperature higher than that at which the valve 22 is opened. The valve 44 is closed by the thermostat 47 only when the cooling fluid reaches the latter predetermined temperature at which the full cooling capacity of the radiator is required.

The bellows of thermostats 35 and 47 are filled respectively with suitable fluids which cause expansion and contraction of the bellows with changes in temperature. The setting of each thermostat is determined by the nature of the fluid introduced into the bellows thereof and may be varied by varying the said fluid. Any suitable fluid or fluid mixture may be employed to produce the opening and closing of the respective valves controlled by the thermostats at the desired predetermined temperatures.

The thermostats may be set respectively to open the valve 22 and to close the valve 44 when the cooling fluid reaches any desired predetermined temperatures. In the preferred form of the invention, the thermostat 35 is constructed to open the valve 22 when the cooling fluid has reached a temperature within the normal running temperature range of the engine and the thermostat 47 is constructed to maintain the valve 44 in open position when the cooling fluid is within this temperature range. The thermostat 47 closes the valve 44 only when the cooling fluid reaches a relatively high predetermined temperature above the normal running temperature range of the engine at which the full cooling capacity of the radiator is required. In actual practice the thermostat 35 has been constructed to open the valve 22 when the cooling fluid reaches a temperature of substantially 150° F. and to locate said valve in fully opened position when the fluid reaches a temperature of substantially 190° F. The thermostat 47 has been constructed to close the valve 44 when the cooling fluid reaches a temperature of substantially 190° F. These settings of the respective thermostats have produced highly satisfactory results in the control of the circulation of the cooling fluid.

The thermostats 35 and 47 are located within the chamber 4 which is some distance below the upper chamber of the radiator so that they are at all times completely immersed in the cooling fluid. The construction shown has the advantage that, when the engine is cold, the cooling fluid, after passing through the engine jacket, is returned from the top of the said jacket to the lower part thereof in relatively short path located within the engine walls so that the fluid loses a minimum amount of heat in its circulation and the engine will heat up very quickly. The thermostats also are located within the engine jacket and are controlled by the temperature of the fluid within the said jacket.

In the preferred form of the invention above described, while the motor is cold, the thermostats 35 and 47 will both be in contracted condition, the valve 22 will be held in closed position by the thermostat 35 and the valve 44 will be held in open position by the thermostat 47 all as clearly shown in the drawing. Substantially as the cooling fluid in the chamber 4 reaches a predetermined temperature, the thermostat 35 expands and opens the valve 22 to allow the fluid from the water jacket of the engine to start circulating through the radiator, the valve moving gradually toward fully open position. The valve 44 continues in open position when the cooling fluid is at a temperature within the normal running temperature range of the engine so that part of the cooling fluid continues to pass through the by-pass 21 and part of said fluid passes through the radiator. The proportions of the parts of the cooling fluid passing through the radiator and through the by-pass are varied automatically by the movements of either one or both of the valves between fully opened and closed positions with the changes in temperature to maintain the fluid within the normal temperature range. The thermostat 47 operates to close the valve 44 only when the cooling fluid reaches a relatively high predetermined temperature above the said normal temperature range of the engine.

The flow of the cooling fluid through the radiator and through the by-pass may be varied in various ways by changes in the setting of the thermostats to vary the temperatures at which the valves controlling the circulation of said fluid are opened and closed.

The employment of the thermostat 47 which operates independently of the thermostat 35 for controlling the valve 44 insures that said valve will be maintained in open position when the cooling fluid is below the predetermined temperature at which said thermostat is set to close the valve or below the temperature at which the full cooling capacity of the radiator is required. Thus the "hunting" action of the thermostatic mechanism produced in prior constructions with the resultant disadvantages referred to above will be avoided.

The thermostats 35 and 47 are preferably arranged in axial alignment, and the plate 40 constitutes a common base, and the yoke 42 a common support or carrier for said thermostats. This results in a very compact arrangement of the thermostats and valves. The thermostats with the yoke 42, valves 22 and 44, stud 32 and support member 25 are all assembled and secured together as a unit and may be applied to or removed from the engine as a unit. The unit is applied to the engine by introducing the same into the opening in the upper left hand end of the chamber 4, Figs. 1 and 2, and positioning the same to engage the flange 27 on the member 25 with the flange 28. The unit is then secured in place by attaching the pipe 6.

It is to be understood that the invention is not limited to the particular construction and arrangement of parts of the illustrated embodiment of the invention but that the construction shown and described is merely illustrative of the invention and that the invention may be embodied in other forms within the scope of the claims.

Having explained the nature and object of the invention and having specifically described a construction embodying the invention in its preferred form, what is claimed is:

1. An internal combustion engine comprising a water jacket, a radiator, pipe connections between the radiator and said jacket, a valve for controlling the flow of cooling fluid through said pipe connections, a by-pass for short circuiting the radiator with relation to the engine, a valve for controlling the flow of fluid through said by-pass, a thermostat for adjusting said first valve above a given fluid temperature, and an independently acting thermostat set to operate at a comparatively widely different temperature for adjusting the second valve.

2. An internal combustion engine comprising a water jacket, a radiator, pipe connections between the radiator and said jacket, a valve for controlling the flow of cooling fluid through said pipe connections, a by-pass for short circuiting the radiator with relation to the engine jacket, a thermostat for maintaining the first valve in closed position when the engine is below a predetermined temperature and for opening said first valve when the engine reaches said temperature, and an independently operating thermostat for maintaining the second valve in open position until the first valve is entirely open, and for closing the second valve when the first valve is entirely open.

3. An internal combustion engine comprising a water jacket, a radiator, pipe connections between the radiator and said jacket, a valve for controlling the flow of cooling fluid through said pipe connections, a by-pass for short circuiting the radiator with relation to the engine, a valve for controlling the flow of fluid through said by-pass, and thermostatically controlled means for opening the first valve when the cooling fluid reaches a predetermined temperature, and for closing the second valve when said fluid reaches a substantially higher predetermined temperature than that effecting initial opening of said first valve.

4. An internal combustion engine comprising a water jacket, a radiator, connections between the water jacket and the radiator, a by-pass for short circuiting the radiator, a thermostatically operated valve within said connection arranged to close the connection when the engine is cold and to gradually open the connection after the cooling fluid passes substantially a predetermined temperature, and a thermostatically operated valve in the connection for controlling the by-pass arranged to open the by-pass when the engine is cold and to close the by-pass when the cooling fluid reaches substantially a higher predetermined temperature fully opening the first mentioned valve.

5. In an internal combustion engine, a water jacket having a chamber at the top of the engine, a radiator, an upper connection between said radiator and said chamber, a lower connection between said jacket and said radiator, a by-pass leading from said chamber to said lower connection for short circuiting the radiator, a disc like support mounted in said chamber, a valve seat on said support, a yoke having arms attached to said support, a thermostat having a chamber attached to said support, a valve secured to said thermostat chamber for engaging said seat, a second thermostat having a chamber attached to said support substantially in an axial alignment with said first thermostat, and a valve attached to said chamber in said second thermostat, said first valve controlling flow through the upper connection and said second valve controlling flow through the by-pass and said thermostats being set to control the operation of said valves at substantially widely different temperatures.

CLYDE R. PATON.